United States Patent [19]

McCormick et al.

[11] Patent Number: 4,717,003
[45] Date of Patent: Jan. 5, 1988

[54] BREAKAWAY CLUTCH FOR ROBOT END-OF-ARM TOOLING

[75] Inventors: Peter E. McCormick; Walter D. Autry, Jr., both of Dallas, Tex.

[73] Assignee: EOA Systems, Dallas, Tex.

[21] Appl. No.: 854,172

[22] Filed: Apr. 21, 1986

[51] Int. Cl.$^4$ .......................... B25J 17/00; B25J 19/00
[52] U.S. Cl. .................................. 192/56 F; 192/116.5; 414/730; 403/2; 901/49
[58] Field of Search ............... 192/56 F, 56 R, 116.5, 192/125 C, 129 B, 150; 166/237; 414/729, 730; 464/35, 36, 37, 38, 26, 24; 403/2, 122; 901/46–49, 28–43

[56] References Cited

U.S. PATENT DOCUMENTS

| 3,488,980 | 1/1970 | Burrough | 192/56 F |
| 3,626,506 | 12/1971 | Spieth . | |
| 3,638,973 | 2/1972 | Poletti . | |
| 3,819,286 | 6/1974 | Blanchi . | |
| 4,103,849 | 8/1978 | Holt et al. . | |
| 4,176,981 | 12/1979 | Clapper et al. . | |
| 4,188,142 | 2/1980 | Olsson . | |
| 4,245,729 | 1/1981 | Lunke et al. | 192/56 F |
| 4,328,621 | 5/1982 | Benjamin | 901/46 X |
| 4,540,331 | 9/1985 | Stanner et al. | 901/49 X |
| 4,557,623 | 12/1985 | Tella . | |

FOREIGN PATENT DOCUMENTS

| 3025952 | 2/1982 | Fed. Rep. of Germany | 403/2 |
| 216892 | 1/1985 | Fed. Rep. of Germany | 901/49 |
| 85/00315 | 1/1985 | PCT Int'l Appl. | 901/49 |

OTHER PUBLICATIONS

Robotic Accessories' brochure entitled "Uni-Coupler Safety Joint", Rumble Equipment advertisement, p. 9, Robotics World, Jan. 1986.
Kuka brochure, pp. 26–27, disclosing collision protective device diagram labeled "G.M. Clutch".

Primary Examiner—Carl D. Friedman
Assistant Examiner—Richard E. Chilcot, Jr.
Attorney, Agent, or Firm—Daniel V. Thompson

[57] ABSTRACT

The invention provides an "on the fly" adjustable clutch for use with robot end-of-arm tooling that provides a means for sensing movement of a tool attached to the clutch and can send a signal to shut down the robot when an overload is encountered. The clutch includes a piston capable of lateral movement within a chamber that is slidably mounted on a pin and a tool plate. The pin extends beyond the clutch housing, and the tool plate is pivotally mounted on the pin. Biasing means acts to bias the piston away from the tool plate such that the tool plate is held somewhat rigidly in relation to the clutch housing by the biasing means. In a preferred embodiment, the biasing means includes springs and pressurized air that may be introduced into the piston chamber on either side of the piston to increase or decrease the bias of the springs. Thus, the clutch is capable of varying sensitivities with the biasing means being adjustable under program control. Also included on the clutch are locating means and proximity sensors. The locating means act to position the tool plate in a normal position in relation to the clutch housing. The proximity sensors detect movement of the tool plate in relation to the housing.

17 Claims, 4 Drawing Figures

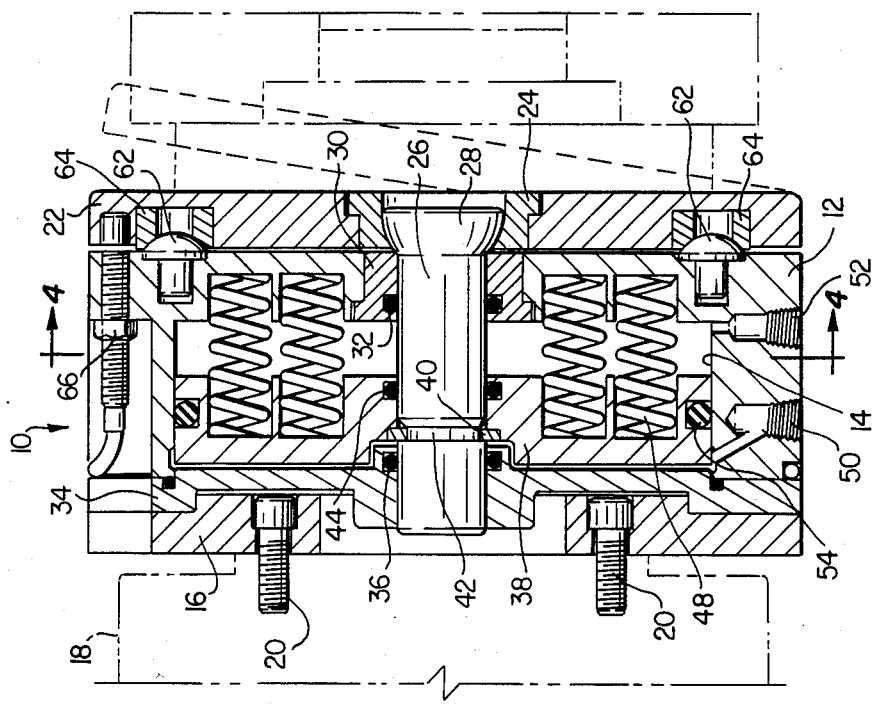
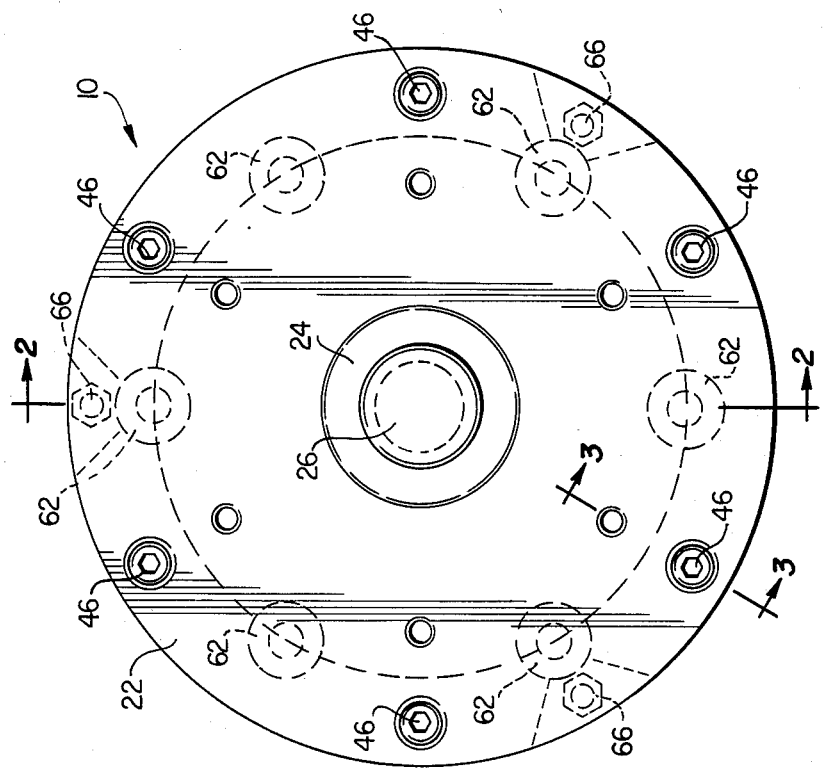

BREAKAWAY CLUTCH FOR ROBOT END-OF-ARM TOOLING

TECHNICAL FIELD

The invention includes an adjustable clutch for use with robot end-of-arm tooling that provides a means for sensing movement of a tool attached to the clutch. The clutch includes a piston held within a chamber that is attached by a pin to a tool plate to which the tool is attached. The piston is capable of lateral movement within the chamber, and the sensitivity of the breakaway clutch is adjusted by biasing the movement of the piston. In the preferred embodiment, the piston is biased using spring means and by introducing pressurized air into the piston chamber. Sensing devices detect movement of the tool plate relative to the clutch to shut down the robot when an overload is encountered.

BACKGROUND ART

A problem in the use of robots in tooling operations is the problem of overload on the robot arm. This may occur if the robot arm or tool collides with something or if the tool gets stuck in the workpiece. Such an overload can cause serious damage to the robot, the robot arm, the tool or to the workpiece.

Several devices have been proposed and are in use that detect stresses and overloads on the robot arm and immediately shut down the robot when overload is detected in order to avoid damage to the robot or to the workpiece. These devices include expandable breakaway joints and connectors that break away when the robot arm experiences an overload. These are troublesome because they often cause repetitive downtime and require reprogramming of the robot. Other devices include safety joints and couplings having spring-loaded elements whose separation is sensed by proximity detectors. These devices usually trigger an emergency stop when an overload is encountered. The sensitivity of the prior art couplers can be adjustable only by manually varying spring load, such as, for example, by turning a nut to increase the bias on the coupler's springs.

A major problem with all of the known devices is that they are not adjustable "on the fly" under program control. "On the fly" adjustability is required to allow for varying degrees of overload sensitivity throughout a programmed motion of the robot. When the robot is moving rapidly about the work area the device needs to be less sensitive in order to avoid inadvertent stoppage of the robot. Similarly, the device should be more sensitive when the robot is performing slower or more intricate motions. Also, the device should allow for interchangeable tooling and ready adjustment for varying weights of tools.

SUMMARY OF THE INVENTION

The present invention provides a breakaway clutch that is adjustable "on the fly" and therefore programmable to allow for varying sensitivities of the clutch to an overload. The clutch is ideal for use in interchangeable tooling as it has ready mounts for various tools, and the clutch can be adjusted to accomodate differing weights of tools. The clutch has sensors that are capable of detecting movement of the tool in relation to the clutch and of tripping an emergency stop when the movement is beyond the range of movement allowed. The clutch restores itself to a normal position when the overload is relieved.

According to one embodiment of the invention, the clutch includes a clutch housing that defines a piston cavity, a piston contained within the cavity, and a tool plate that is sealingly attached to the piston through the housing by securing means. The clutch includes biasing means to bias the piston in a direction opposite of the tool plate. The clutch has locating means for positioning the tool plate in a normal operational position in relation to the housing and proximity sensing means for sensing deviations of the tool plate from its normal position. In a preferred embodiment, the securing means includes a pin that is attached to the piston with the tool plate pivotally mounted on the pin. Thus, the tool plate may move laterally in relation to the housing as the piston moves within the cavity and pivotally about the pin. Also, in a preferred embodiment, the locating means includes studs mounted in the housing that engage in bushings located in the tool plate.

In a preferred embodiment of the invention, the biasing means includes spring means located within the piston cavity and means for admitting pressurized air into the piston cavity on either side of the piston face. The admission of pressurized air allows the clutch to be more rigid or less rigid than the design incorporating the spring means alone. The spring means are such that they may be used to bias the piston without the use of pressurized air. The addition of pressurized air to the biasing means allows the clutch to have variable sensitivity and to accommodate heavier tool loads. The pressure of air in the piston cavity may be varied according to the robot's program to provide appropriate levels of sensitivity at various points in the program.

BRIEF DESCRIPTION OF THE DRAWINGS

The foregoing and additional objects and advantages of the invention will be more apparent when the following Detailed Description is read in conjunction with the accompanying Drawings, wherein like reference characters denote like parts in all views and wherein:

FIG. 1 is an end view of the clutch of the present invention;

FIG. 2 is a sectional view taken along lines 2—2 of FIG. 1;

DETAILED DESCRIPTION

Figure 4:
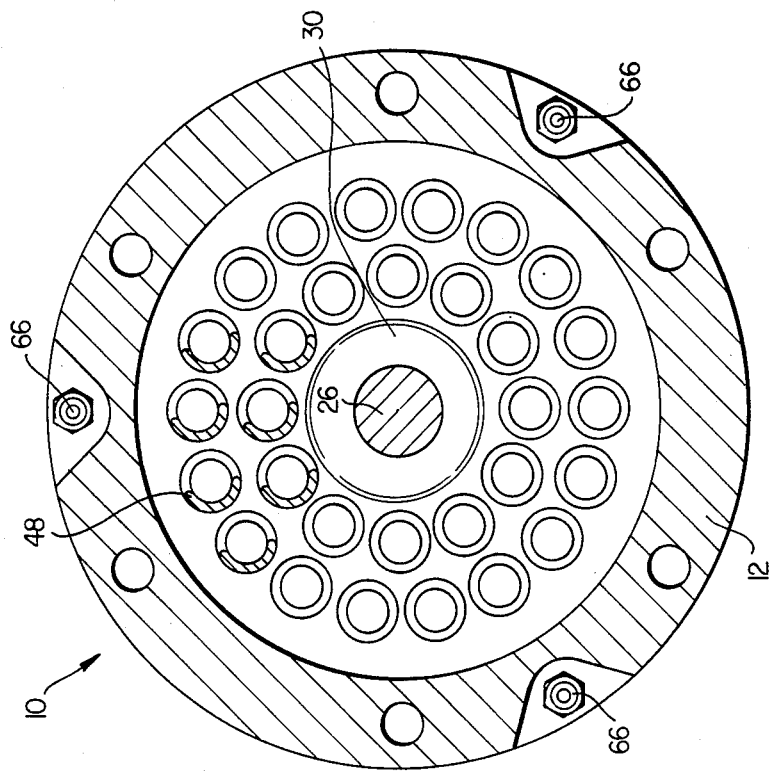
FIG. 4 is a sectional view taken along lines 4—4 of FIG. 2.

The invention provides an "on the fly" adjustable clutch for use with robot end-of-arm tooling. The clutch is positioned between the robot arm and the tool and provides a means of sensing motion of the tool relative to the clutch that would indicate an overload on the system. The clutch is adjustable under program control so as to vary the load capacity and resistance of the clutch to handle various types and sizes of tools with varying sensitivity and is therefore ideal for use in interchangeable tooling systems. The clutch may be used in combination with a robot having an emergency stop, or other stop means, so that when an overload is sensed by the clutch it trips the emergency stop thereby preventing damage to the robot, the tool or to the workpiece.

Referring to the Drawings, FIG. 1 shows an end view of the clutch which is generally indicated as 10, and FIG. 2 shows a cross-sectional view of the clutch through line 2-2 in FIG. 1. The clutch 10 includes a housing 12 having a piston cavity 14. The clutch is attached to the robot arm through end plate 16 being bolted to the robot arm 18 by means of bolts 20. Robot arm 18 is shown in phantom lines in FIG. 2. A tool plate 22 is attached to the housing through pin 26 as tool plate 22 is pivotally mounted to pin 26 through a partial ball and socket joint comprised of socket member 24 and semi-spherical surface 28 on pin 26. A phantom line 29 shows the pivotal motion of tool plate 22. Tool plate 22 may pivot about pin 26 and is capable of rotation about pin 26.

Figure 3:
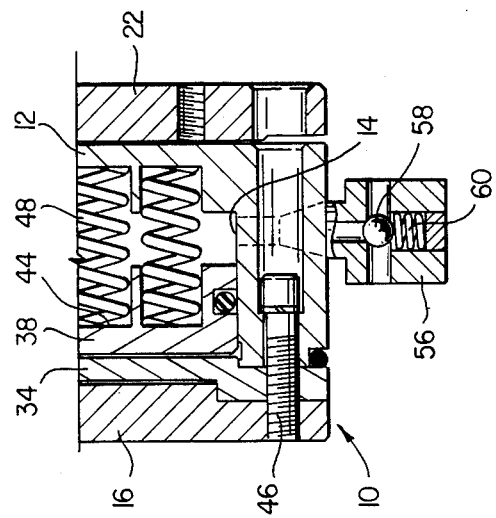
FIG. 3 is a partial sectional view taken along lines 3—3 of FIG. 1.

Pin 26 is slidably and sealingly mounted through the housing 12 by bushing 30 and O-ring 32. Similarly, pin 26 is slidably and sealingly mounted to an intermediate plate 34 by means of O-ring 36. Piston 38 is mounted on pin 26 by means of lock ring 40 engaged in groove 42 of pin 26. Piston 38 is positioned within piston cavity 14 such that it can move laterally within cavity 14. An O-ring 44 is provided to seal the connection between pin 26 and piston 38. As shown in FIG. 3, end plate 16, intermediate plate 34 and the housing 12 are connected to one another by means of bolts 46. FIG. 3 shows bolts 46 recessed within a channel 47 that extends through tool plate 22 to provide easy access to the bolts. The recessed bolts 46 are also shown in FIG. 1.

In one embodiment of the invention, the piston 38 is biased within cavity 14 towards intermediate plate 34 by biasing means, indicated by spring means 48 in FIG. 2. Pin 26 is proportioned so as to hold tool plate 22 snug against the housing 12 when the piston 38 is nearly snug against intermediate plate 34. As piston 38 moves laterally within cavity 14 towards the tool plate end of cavity 14, the tool plate 22 is held less snugly against the housing 12, and the tool plate is more free to pivot about pin 26. The lateral position of piston 38 within cavity 14 therefore defines the rigidity by which tool plate 22 is held by pin 26. The position of piston 38 within cavity 14 is determined by the compressibility of the biasing means as they counteract the weight of a tool attached to the tool plate 22 and any overload forces applied to the tool. The biasing means are used to hold the tool plate in a semi-rigid fashion in relation to the clutch housing.

According to the preferred embodiment of the invention shown in FIG. 2, the biasing means includes the use of a plurality of springs 48 in combination with pressurized air into the cavity 14. The air pressure in cavity 14 provides a variable amount of bias on piston 38 with such bias being remotely adjustable under program control. The capability to alternatively vary the air pressure in cavity 14 on either side of the piston 38 enables the bias to be increased above or decreased below the bias provided by the springs 48. As shown in FIG. 2, this dual capability is provided by ports 50 and 52 which communicate with cavity 14 on opposite sides of piston 38. Port 50 communicates with the face side of piston 38. The two sides of piston 38 are sealed off by means of O-ring 54. Increasing air pressure on the face side of cavity 14 through port 50 decreases the bias on the piston 38 provided by the springs, and alternatively, increasing air pressure at port 52 on the side opposite of the face increases the bias on piston 38 over and above that bias provided by the springs. In the preferred embodiment, the spring means 48 are selected such that the clutch can hold a 900 pound or 2300 in-lb end effector without the addition of pressurized air.

The preferred embodiment may also include a pressure relief valve 56 in communication with the cavity 14 as shown in FIG. 3. The relief valve contains a ball 58 supported by spring 60 that seals off the relief passage until a pressure sufficient to open the valve forces the ball 58 against the spring 60. FIG. 3 shows a relief valve on just one side of the piston 38, but a relief valve could be incorporated to work on the face side of piston 38 as well.

The clutch 10 also includes locating means for positioning the tool plate 22 in a normal position in relation to the clutch housing 12. This normal position for the tool plate would be similar to the position shown in FIG. 2—mostly parallel to the housing 12. In a preferred embodiment shown in FIG. 2, the locating means includes studs 62 mounted in the housing and projecting towards the tool plate 22. The exposed ends of the studs are semi-spherical surfaces which engage bushings 64 within tool plate 22. The biasing means acting on the piston 38 biases the tool plate 22 towards the housing so that the studs 62 engage with the bushings 64 and hold the tool plate in a normal position relative to the clutch housing.

The clutch 10 also includes proximity sensing means for sensing the relative movement of the tool plate 22 to the housing 12. Proximity sensors 66 are shown in FIG. 2. FIGS. 1 and 4 show one embodiment of the clutch that include three sensors located equilaterally around the clutch 10. These sensors 66 may be electro-magnetic devices, or other suitable devices, that sense the distance from the housing 12 to the tool plate 22. The sensors act to detect deviations of the tool plate from its normal position. When the relative distance between the tool plate and the clutch housing changes beyond a desired limit, the sensors 66 send a signal to the robot to stop movement of the robot arm.

In operation, the clutch 10 is usable to sense an overload on the robot arm, such as would be caused when a tool attached to the arm has struck an object, or becomes embedded in a workpiece, and the clutch can send a signal such as an emergency stop or other suitable stop device that quickly disables the robot arm to prevent damage to the robot, the tool or to the workpiece. As the tool strikes something, gets wedged in a workpiece, or for some other reason experiences an overload force, it causes the tool plate 22 to be moved from its normal position as it pivots about pin 26 and forces piston 38 against the biasing means. If the tool plate is sufficiently dislodged from its normal position, the sensors sense the deviation and trigger the emergency stop. Once the obstruction has been removed, the biasing means will bring the tool plate back into its normal position.

The sensitivity of the clutch to an overload may be infinitely varied by adjustment of the biasing means. In the preferred embodiment, this is accomplished by varying the air pressures in cavity 14 by way of a 16-stage air regulator operated by the robot controller to apply 0 to 80 p.s.i. in 5 p.s.i. increments. Thus, in programming a work sequence for the robot, the user can select any of the sensitivity levels for the clutch at any particular point in the program. The user may vary the sensitivity of the clutch with any type of robot controller throughout the entire robot program by varying the pressures applied to ports 50 and 52. The clutch can be made to be very stiff while the robot is moving rapidly, in order to avoid inadvertent tripping of the emergency stop. Similarly, the clutch can be made to be less rigid and very sensitive while the robot is performing slow motions so as to detect the slightest overload problem as indicated by a departure from the normal position. This prevents damage to the robot, the tool and to the workpiece.

In addition, the proximity sensors 66 may also be adjusted to allow for slight displacements of the tool plate 22 without tripping the stop means on the robot.

From the foregoing Detailed Description, it should be apparent that the invention described is an adjustable clutch for use with robot end-of-arm tooling so as to detect an abnormal position or overload on the robot arm. Having described only a single embodiment of the invention, it will be apparent to those skilled in the art that there may be many changes and modifications to this invention without departing from the spirit and scope of the invention.

We claim:

1. A breakaway clutch for robot end-of-arm tooling comprising:
   a housing having a piston cavity;
   a piston confined within the piston cavity, said piston capable of lateral movement within said cavity;
   a tool plate;
   securing means for connecting the tool plate to the piston;
   biasing means for biasing the piston away from the tool plate, said biasing means being adjustable to vary the bias;
   locating means for positioning the tool plate in a normal position in relation to the housing; and
   proximity sensing means for sensing relative movement between the tool plate and the housing.

2. The clutch of claim 1 wherein the securing means includes a pin attached to the piston and that is pivotally attached to the tool plate.

3. The clutch of claim 1 wherein the biasing means includes spring means.

4. The clutch of claim 1 wherein the biasing means includes means for admitting pressurized air into the piston cavity to adjust the biasing capacity.

5. The clutch of claim 4 wherein the biasing means also includes spring means.

6. The clutch of claim 1 wherein the locating means includes studs mounted in the housing with spherical exposed ends and bushings located in the tool plate, said stud ends engaging within the bushings when the tool plate is positioned in a normal position relative to the housing.

7. The clutch of claim 1 in combination with a robot having an emergency stop, and wherein said proximity sensing means trips the emergency stop when the tool plate has deviated a predetermined amount from said normal position.

8. The clutch of claim 7 wherein the proximity sensing means may be variably set to trip the emergency stop for various deviations of the tool plate from its normal position.

9. A breakaway clutch for robot end-of-arm tooling comprising:
   a clutch housing having a piston cavity;
   a piston confined within the piston cavity, said piston capable of lateral movement within said cavity;
   a tool plate;
   a pin attached to the piston and pivotally attached to the tool plate;
   biasing means for biasing the piston away from the end of the piston cavity closest to the tool plate, said biasing means being variable and including spring means;
   locating means for positioning the tool plate in a normal position in relation to the clutch housing; and
   proximity sensing means for sensing deviations of the tool plate from its normal position in relation to the clutch housing.

10. The clutch of claim 9 wherein the biasing means includes means for admitting pressurized air into the piston cavity to adjust the biasing capacity.

11. The clutch of claim 9 wherein the locating means includes studs mounted in the housing and bushings mounted in the tool plate, said studs having spherical exposed ends that engage with said bushings to locate the tool plate.

12. The clutch of claim 9 wherein the proximity sensing means can sense variable deviations of the tool plate.

13. A breakaway clutch for robot end-of-arm tooling comprising:
    a clutch housing having a piston cavity, said housing having a tool end and a robot end;
    a piston confined within the piston cavity, said piston capable of lateral movement within said cavity and said piston having a face side;
    a tool plate located external to the housing and adjacent to said tool end of the housing;
    a pin attached to the piston, and said tool plate being pivotally mounted on said pin;
    spring means for biasing the piston away from the tool end of the housing;
    locating means for positioning the tool plate in a normal position in relation to the housing;
    proximity sensing means for sensing relative movements of the tool plate from the housing; and
    means for admitting pressurized air into the piston cavity to adjust the biasing of the piston provided by the spring means and to adjust the load capacity of the clutch.

14. The clutch of claim 13 wherein the means for admitting pressurized air includes means for introducing pressurized air into the portion of the piston cavity adjacent to the face of the piston and into the portion of the cavity adjacent to the side of the piston opposite the face of the piston.

15. The clutch of claim 13 wherein the locating means includes studs mounted in the tool end of the housing, said studs having exposed spherical ends, and said locating means also including bushings mounted in the tool plate such that the spherical ends of the studs engage within the bushings to position the tool plate.

16. The clutch of claim 13 in combination with a robot having an emergency stop, and wherein said proximity sensing means trips the emergency stop when the tool plate has deviated a predetermined amount from the normal position to avoid damage to the tool, the workpiece, or the robot.

17. The clutch of claim 16 wherein the pressure of the air admitted into the piston cavity is varied throughout a robot program in order to provide varying degrees of bias on the piston.

* * * * *